United States Patent  
Teulon et al.

(10) Patent No.: US 12,136,865 B2
(45) Date of Patent: Nov. 5, 2024

(54) ROTARY ELECTRIC MACHINE PROVIDED WITH AN END SHIELD HAVING AN INNER FACE CONFIGURED FOR COOLING

(71) Applicant: VALEO EQUIPEMENTS ELECTRIQUES MOTEUR, Creteil (FR)

(72) Inventors: Fabien Teulon, Creteil (FR); Ibrahima Diankha, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 235 days.

(21) Appl. No.: 17/777,199

(22) PCT Filed: Dec. 16, 2020

(86) PCT No.: PCT/EP2020/086590
§ 371 (c)(1),
(2) Date: May 16, 2022

(87) PCT Pub. No.: WO2021/122858
PCT Pub. Date: Jun. 24, 2021

(65) Prior Publication Data
US 2022/0407380 A1 Dec. 22, 2022

(30) Foreign Application Priority Data

Dec. 19, 2019 (FR) ..................................... 19 15034

(51) Int. Cl.
*H02K 5/15* (2006.01)
*H02K 9/06* (2006.01)

(52) U.S. Cl.
CPC ................. *H02K 5/15* (2013.01); *H02K 9/06* (2013.01)

(58) Field of Classification Search
CPC ................................... H02K 5/15; H02K 9/06
See application file for complete search history.

(56) References Cited

U.S. PATENT DOCUMENTS

| | | |
|---|---|---|
| 2010/0320878 A1 | 12/2010 | Izumi et al. |
| 2014/0354092 A1* | 12/2014 | Hasegawa ............... H02K 5/207 310/63 |
| 2017/0317556 A1 | 11/2017 | Hasegawa et al. |

FOREIGN PATENT DOCUMENTS

| | | |
|---|---|---|
| EP | 2 264 868 A2 | 12/2010 |
| EP | 2 811 624 A1 | 12/2014 |

(Continued)

OTHER PUBLICATIONS

International Search Report issued Feb. 18, 2021 in PCT/EP2020/086590 filed on Dec. 16, 2020, 2 pages.

*Primary Examiner* — Jue Zhang
(74) *Attorney, Agent, or Firm* — Oblon, McClelland, Maier & Neustadt, L.L.P.

(57) ABSTRACT

Rotary electric machine for a motor vehicle includes a stator, extending along an axis, the stator including a body and a winding provided with lead-out wires extending axially on either side of the stator body. At least one end shield includes a plate extending transversely and a skirt extending axially from the plate, the plate having an inner face oriented towards a lead-out wire of the winding. The inner face includes a main recess which increases the minimum axial distance separating the lead-out wire from the inner face, the main recess having a bottom extending radially.

14 Claims, 2 Drawing Sheets

(56) References Cited

FOREIGN PATENT DOCUMENTS

FR         2 993 421 A1    1/2014
FR         3 066 659 A1    11/2018

* cited by examiner

ROTARY ELECTRIC MACHINE PROVIDED WITH AN END SHIELD HAVING AN INNER FACE CONFIGURED FOR COOLING

BACKGROUND OF THE INVENTION

Field of the Invention

The present invention relates to a rotary electric machine provided with an end shield having an internal face configured to improve cooling. The invention is particularly advantageously, but not exclusively, applicable to the field of alternators, starter-alternators and electric motors and reversible electric machines for vehicles, in particular motor vehicles.

Description of the Related Art

A motor vehicle with an internal combustion engine is equipped with a machine whose function is to convert the mechanical energy coming from the engine into electrical energy with the particular aim of recharging the battery of the vehicle and of supplying power to the on-board network of the vehicle.

In a manner known per se, such a machine has a casing and, inside the latter, a claw-pole rotor that rotates as one with a shaft, and a stator which surrounds the rotor with the presence of an air gap. A pulley fastened to the front end of the shaft forms part of a belt-type movement transmission device between the internal combustion engine and the electric machine.

The stator has a body formed of a stack of laminations provided with slots for mounting the phase windings of the stator winding. The stator extends along an axis. These phase windings form bundles that protrude axially on either side of the stator body. These phase windings are for example three-phase windings that are star- or delta-connected, the outputs of which are connected to at least one electronic rectifier module having rectifier elements, such as diodes or transistors.

Furthermore, the rotor has two pole wheels. Each pole wheel has a base of transverse orientation, the outer periphery of which is provided with claws, for example of trapezoidal shape. The claws of one wheel are directed axially toward the base of the other wheel. Each claw of a pole wheel penetrates into the space between two neighboring claws of the other pole wheel, such that the claws of the pole wheels are nested with each other.

The rotor shaft is borne with the ability to rotate by the front bearing and the rear bearing of the casing. To this end, the bearings have a hollow shape and are each formed of an end shield, and are each provided centrally with a ball bearing. The end shields have axial and lateral openings in order to allow the machine to be cooled by circulation of air brought about by the rotation of fans positioned on the axial end faces of the rotor. Each fan is provided with a plurality of blades. The lateral openings made in the end shields are located opposite corresponding bundles.

However, it has been observed that the machine may overheat during tests carried out at high temperatures, of around 100° C. in particular, that are representative of the significant thermal stresses in the environment under the hood of the vehicle in which the rotary electric machine is located.

A known solution consists in having, on the internal face, an inclined portion making it possible to increase the flow of air at the bundles. However, this solution has the drawbacks of a turbulent flow: the air is heated by the turbulence and cannot effectively cool the rotor. In order to eliminate this turbulence phenomenon, one solution is to render a portion straight. But in this case the temperature problem is not solved, and the machine heats up too much.

BRIEF SUMMARY OF THE INVENTION

The invention aims to effectively remedy this drawback. To this end, a first aspect of the invention concerns a rotary electric machine for a motor vehicle. The machine has:
a stator, extending along an axis, said stator having a body and a winding provided with bundles extending axially on either side of the stator body,
at least one end shield having a transversely extending plate and a skirt extending axially from the plate,
the plate having an internal face oriented toward a winding bundle,
characterized in that the internal face has a main recess that increases the minimum axial distance separating the bundle from the internal face, the main recess having a radially extending bottom.

The air circulated by the fan flows through an enlarged "channel" which has a constant cross section in a radial plane. Thus, more air can be pushed out of the machine by the blades, and in addition, the air flows in a laminar manner. These two effects combined make it possible to effectively cool the machine. In addition, the quantity of material required to make the end shield is reduced, this allowing a reduction in the weight of the machine and in costs.

According to one embodiment, the main recess locally decreases the thickness of the plate and locally increases the minimum axial distance.

According to one embodiment, the minimum axial distance is substantially constant. According to one embodiment, the minimum axial distance is substantially constant over the radial thickness of the bundle. Substantially is understood to mean that any variation of this minimum axial distance does not exceed 5%. This variation may be due to the undulations or irregularities of the bundle.

According to one embodiment, the bottom of the main recess extends radially along a length corresponding to at least the radial length of the bundle.

Alternatively, the bottom of the main recess extends radially along a length corresponding to less than the radial length of the bundle.

According to one embodiment, the main recess extends axially.

According to one embodiment, the rotary electric machine has a drive member and the end shield is located between said drive member and the stator, the end shield then being called the front end shield.

According to one embodiment, the front end shield has a plurality of lateral openings for the passage of cooling air.

According to one embodiment, the rotary electric machine has a second end shield, referred to as the rear end shield, and fixing members joining the front end shield to the rear end shield.

According to one embodiment, the main recess extends circumferentially around the entire circumference of the internal face of the plate. According to another embodiment, the main recess extends circumferentially around a portion of the circumference of the plate. According to another embodiment, the main recess extends circumferentially between the fixing members. According to another embodiment, the main recess extends circumferentially over the parts of the internal face of the front end shield that have lateral openings.

According to one embodiment, the main recess has a set-back portion.

According to one embodiment, the rotary electric machine has a fan having at least one blade and the set-back portion is arranged axially opposite the blade.

According to one embodiment, the set-back portion has a curved shape.

According to one embodiment, the curvature of the set-back portion has a radius greater than or equal to 0.9 times the minimum axial distance.

Thus, the air flow "channel" retains a constant or virtually constant cross section even at the level of the set-back portion, allowing a laminar flow of the air pushed by the blades and therefore better cooling.

According to one embodiment, the fan comprises a radially extending disk and at least one axially extending blade, which is fixed to the disk.

According to one embodiment, the at least one blade extends along the axis over a height referred to as the blade height, the blade height comprising the axial thickness of the disk and the axial thickness of the blade.

According to one embodiment, the minimum axial distance is between one third of the blade height and half the blade height.

Thus, a very good compromise is obtained between the axial size of the machine and the cooling. The machine takes up little space in the axial direction while being adequately cooled.

According to one embodiment, the internal face has a secondary recess locally bringing the axial distance separating the bundle from the internal face to an increased axial distance, the secondary recess having a radially extending bottom, referred to as the secondary bottom.

Thus, since the cross section is once again widened and constant, more air can flow out of the machine in a laminar manner. The machine is therefore cooled to an even better extent.

According to one embodiment, the secondary bottom extends radially along a length corresponding to at least half the radial length of the bundle.

Alternatively, the secondary bottom extends radially along a length corresponding to less than half the radial length of the bundle.

According to one embodiment, the secondary recess has a set-back portion, referred to as the secondary set-back portion, said secondary set-back portion being arranged axially opposite the bundle.

According to one embodiment, the secondary set-back portion has a curved shape having a radius of curvature greater than the difference between the increased axial distance and the minimum axial distance.

The air which is pushed by the blades and comes from the flow between the bundle and the bottom of the main recess may effectively rush in between the bottom of the secondary recess and the bundle and therefore then escape from the machine, allowing better cooling.

According to one embodiment, the increased axial distance is greater than the minimum axial distance.

According to one embodiment, the increased axial distance is greater than one and a half times the minimum axial distance.

According to one embodiment, an axial projection of the fan with respect to the bundle is positive, zero or negative.

According to one embodiment, the ratio of an axial projection of the fan with respect to the bundle to the blade height is less than 0.2.

According to one embodiment, the ratio of an axial projection of the fan with respect to the bundle to the blade height is negative.

Thus, a small axial projection of the fan with respect to the bundle, even if negative, and within the aforementioned limit, makes it possible to maintain a sufficient distance between the top of the blade and the internal surface of the plate, in order to allow the air to be pushed outward by the blades, while cooling a large portion of the bundle.

According to one embodiment, the secondary recess extends circumferentially around the entire circumference of the internal face of the plate. According to another embodiment, the secondary recess extends circumferentially around a portion of the circumference of the plate. According to another embodiment, the secondary recess extends circumferentially between the fixing members. According to another embodiment, the secondary recess extends circumferentially over the parts of the internal face of the front end shield that have lateral openings.

BRIEF DESCRIPTION OF THE SEVERAL VIEWS OF THE DRAWINGS

The invention and its various applications will be understood better upon reading the following description and examining the accompanying figures, in which.

DETAILED DESCRIPTION OF THE INVENTION

The figures are presented only by way of entirely non-limiting indication of the invention.

For greater clarity, identical or similar elements are identified by identical reference signs throughout the figures.

A motor vehicle with an internal combustion engine is equipped with a rotary electric machine, such as an alternator, a starter-alternator, an electric motor or a reversible machine.

A machine such as an alternator is a machine configured to convert the mechanical energy coming from the internal combustion engine into electrical energy with the particular aim of recharging the battery of the vehicle and of supplying electrical power to the on-board network of the vehicle.

A machine such as a starter-alternator is a reversible alternator, that is to say it also has an operating mode in which it converts electrical energy into mechanical energy in order, in particular, to start the internal combustion engine of the motor vehicle. In this case, the rotary machine behaves like an electric motor.

Figure 1:
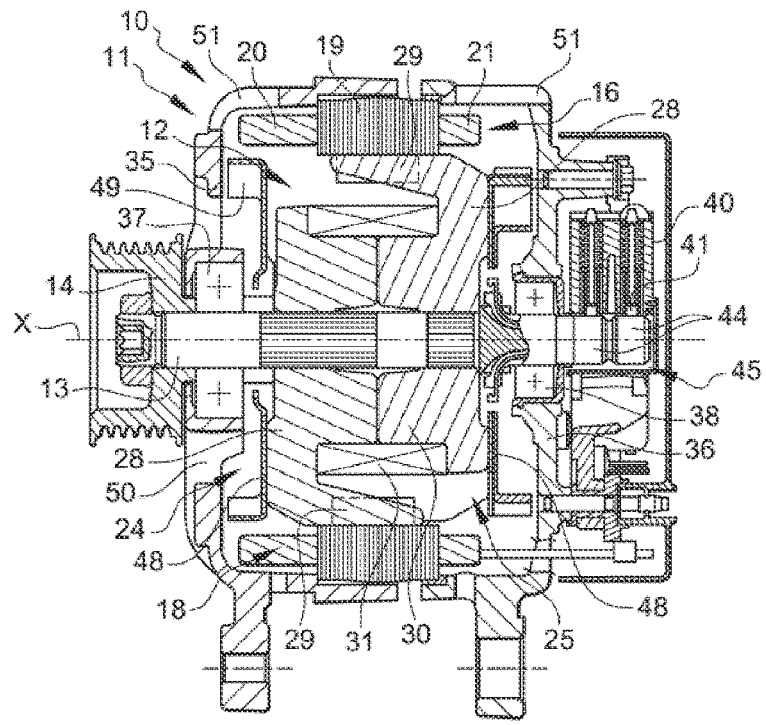
FIG. 1 is a schematic view in longitudinal section of a machine, according to one embodiment of the invention.

FIG. 1 shows a compact and polyphase machine 10, in particular for a motor vehicle. This machine 10 has a casing 11 and, inside the latter, a claw-pole rotor 12 mounted on a shaft 13, and a stator 16 which surrounds the rotor 12 with the presence of an air gap. A drive member such as a pulley 14 is fixed to the shaft 13. This pulley 14 forms part of a belt-type movement transmission device between the machine 10 and the internal combustion engine of the motor vehicle. As a variant, the pulley 14 is replaced by a cup driven directly by the internal combustion engine.

The stator 16 extends along an axis X that is coaxial with the axis of the shaft 13. The stator 16 has a body 19 in the form of a stack of laminations provided with teeth delimiting slots for mounting a winding 18. The winding 18 has phase windings passing through the slots of the stator body 19 and forming a front bundle 20 and a rear bundle 21 that protrude on either side of the stator body 19.

The phase windings are obtained for example from a continuous wire covered with enamel or from conductive elements in bar form, such as pins joined together for example by soldering. These windings are, for example, three-phase or dual three-phase windings that are star- or delta-connected, the outputs of which are connected to at least one rectifier bridge having rectifier elements such as diodes or MOSFET transistors, in particular when a starter-alternator (as described for example in the document FR2745445) or an inverter is involved.

The rotor 12 has two pole wheels 24, 25 each having a base 28 of transverse orientation the outer periphery of which is provided with claws 29, for example of trapezoidal shape. The claws 29 of one wheel 24, 25 are directed axially toward the base 28 of the other wheel. Each claw 29 of a pole wheel 24, 25 penetrates into the space between two neighboring claws 29 of the other pole wheel, such that the claws 29 of the pole wheels 24, 25 are nested with each other.

A cylindrical core 30 is interposed axially between the bases 28 of the wheels 24, 25. In this instance, the core 30 consists of two half-cores, each belonging to one of the bases 28. This core 30 bears, at its outer periphery, an excitation coil 31 wound in an insulator interposed radially between the core 30 and the coil 31.

Furthermore, the casing 11 has front and rear bearings assembled together by means of fixing members, such as tie rods. The bearings have a hollow shape and are respectively formed of a front end shield 35 and a rear end shield 36, and are respectively provided centrally with a ball bearing. The end shields 35, 36 have a hollow shape and are each provided centrally with a housing 37, 38 for receiving the ball bearings for the rotational mounting of the shaft 13 of the rotor. The rear end shield 36 bears a brush holder 40 provided with brushes 41 that are intended to rub against rings 44 of a commutator 45 that are connected to the excitation coil 31 by wired connections. The brushes 41 are electrically connected to a voltage regulator or a control module.

The front end shield 35 and rear end shield 36 have axial openings 50 and lateral openings 51 in order to allow the machine 10 to be cooled by circulation of air brought about by the rotation of fans 48 fixed to the axial end faces of the rotor 12. Each fan 48 is provided with a plurality of blades 49. The lateral openings 51 are located opposite the corresponding front bundle 20 and rear bundle 21.

Figure 2:
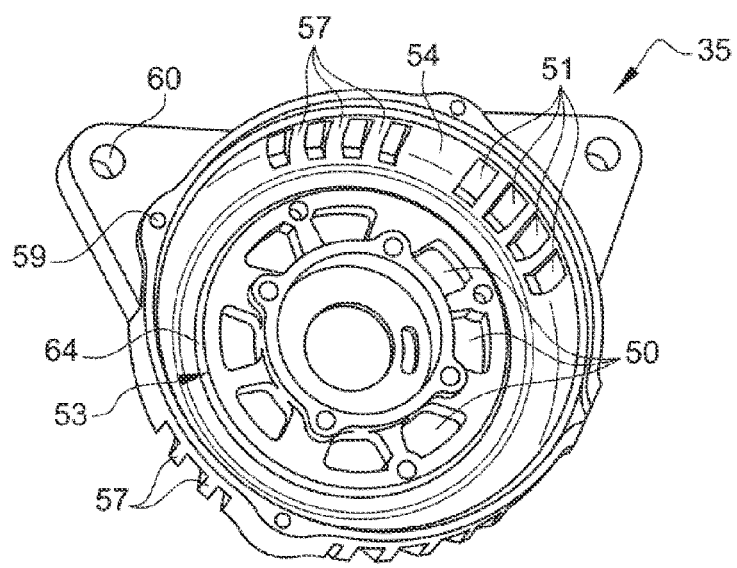
FIG. 2 is a partial perspective view of an end shield of the rotary electric machine according to the present invention.

More specifically, as can be seen in FIG. 2, the front end shield 35 has a plate 53 of generally transverse orientation and a skirt 54 originating from an outer periphery of the plate 53 and extending axially along the axis X. The axial openings 50 are made in the plate 53. The lateral openings 51 are made at least in the skirt 54. Specifically, if necessary, a portion of the lateral openings 51 may extend into the plate 53.

The lateral openings 51 are delimited by fins 57. There is thus an alternation of openings 51 and fins 57 around the circumference of the skirt 54, two successive openings 51 being separated by a fin 57.

As illustrated in FIG. 2, the front end shield 35 has several lateral openings 51, for example in groups of four or two, with little space between the lateral openings of one and the same group in the circumferential direction.

In addition, the skirt 54 has at least one through-hole 59 for the passage of a fixing member, such as a tie rod, in order to keep the end shield 35 bearing against the stator body 19 or against the other end shield 36. The end shield 35 also has protruding lugs 60 with holes to allow the rotary electric machine 10 to be fixed to a fixed element of the vehicle body.

According to the invention, the front end shield 35 has a main recess 64. In this example, the main recess 64 extends circumferentially. The main recess 64 extends radially between the axial openings 50 and the lateral openings 51. The main recess 64 will now be described in more detail with reference to FIG. 3.

Figure 3:
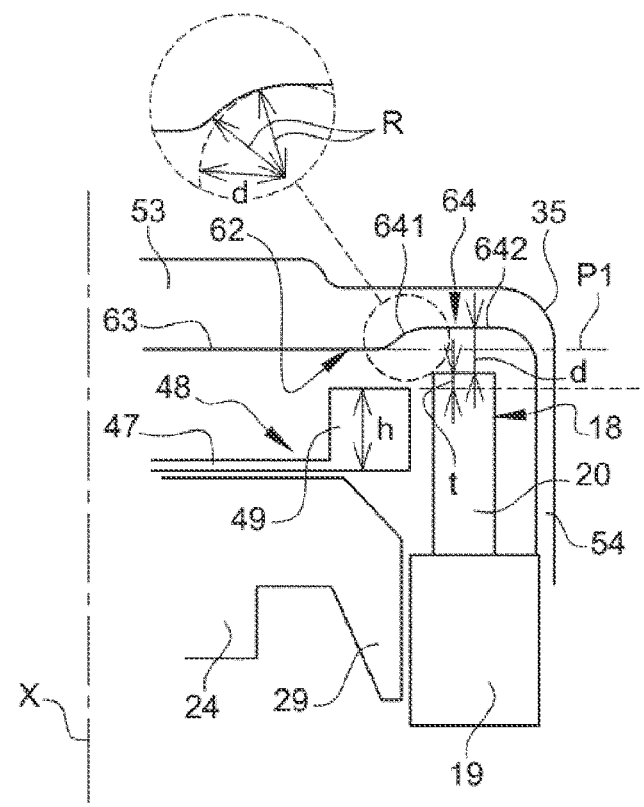
FIG. 3 is a schematic view in partial section illustrating the configuration of the internal face of the end shield of the rotary electric machine according to a first embodiment of the invention.

As can be seen in FIG. 3, the end shield 35 has an internal face 62 oriented toward the winding bundle 20. The internal face 62 of the plate 53 has a central annular portion 63 extending in a plane P1 that is orthogonal with respect to the axis X, and also a peripheral annular portion, referred to as the main recess 64, located in the continuation of the central portion 63. The central annular portion 63 is radially closer to the axis X than the main recess 64. That radial portion of the plate 53 which has the main recess 64 forms the junction between that radial portion of the plate 53 which has the central annular portion 63 and the skirt 54 of the end shield 35.

The main recess extends axially. In other words, the hollow shape which characterizes said main recess is arranged in the axial direction. The main recess 64 increases the minimum axial distance d separating the bundle 20 from the internal face 62, the main recess 64 having a radially extending bottom 642. In the example illustrated, the bottom 642 extends radially along a length corresponding to at least the radial length of the bundle 20. In other words, the main recess 64 increases the axial distance separating the bundle 20 from the bottom 642 of the main recess 64 with respect to the axial distance separating the bundle 20 from the central annular portion 63.

The main recess 64 also has a set-back portion 641.

The internal face 62 therefore has the central annular portion 63, the set-back portion 641 and the bottom 642.

The minimum axial distance d separating the bundle 20 from the internal face 62 is therefore increased at the bottom 642 of the main recess. In other words, the bottom 642 is set back, in the axial direction, with respect to the central annular portion 63, the axial thickness of the plate 53 being, in this illustrated example, thinner at the bottom 642 of the recess 64 than at the central annular portion 63. Thus, the main recess locally decreases the thickness of the plate 53 and locally increases the minimum axial distance d separating the bundle from the internal face of the plate.

The minimum axial distance d separating the bundle 20 from the internal face 62 is substantially constant, in this case over the radial thickness of the bundle 20. Substantially is understood to mean that any variation of this minimum axial distance does not exceed 5%. This variation is due to the undulations or irregularities of the bundle, these in turn being due to the winding 18.

The set-back portion 641 forms the junction between the central annular portion 63 and the bottom 642 of the recess 64. The set-back portion 641 may be arranged axially opposite at least one blade 49 of the fan 48. The set-back portion 641 may have a curved shape. As illustrated in the enlarged part of FIG. 3, the curvature of the set-back portion 641 has for example a radius R greater than or equal to 0.9 times the minimum axial distance d.

The fan 48 comprises a radially extending disk 47 and at least one axially extending blade 49, which is fixed to the disk 47. The blade extends along the axis X over a height referred to as the blade height, the blade height comprising the axial thickness of the disk 47 and the axial thickness of the blade. The minimum axial distance may be between one third of the blade height and half the blade height.

Figure 4:
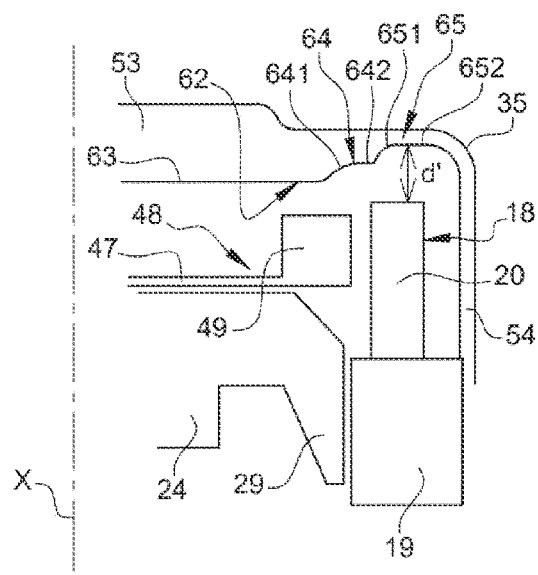
FIG. 4 is a schematic view in partial section illustrating the configuration of the internal face of the end shield of the rotary electric machine according to a second embodiment of the invention.

According to another embodiment, illustrated in FIG. 4, the internal face 62 of the plate 53 has a central annular portion 63 extending in the plane P1 that is orthogonal with respect to the axis X (the same as in FIG. 3), and also an intermediate annular portion, corresponding to the main recess 64 described above, and a peripheral annular portion referred to as the secondary recess 65. The main recess 64 is located in the continuation of the central portion 63, and the secondary recess 65 is located in the continuation of the main recess 64.

As before, the main recess 64 extends axially and has a set-back portion 641 and a bottom 642. The description given above with regard to the set-back portion 641 is applicable in this embodiment. The bottom 642 extends radially, for example, along a length corresponding to less than half the radial thickness of the bundle.

The secondary recess extends axially. In other words, the hollow shape which characterizes said secondary recess is arranged in the axial direction. The secondary recess 65 locally brings the axial distance separating the bundle 20 from the internal face 62 to an increased axial distance d', the secondary recess 65 having a radially extending bottom, referred to as the secondary bottom 652. In the example illustrated, the bottom 652 extends radially along a length corresponding to at least half the radial length of the bundle 20, but it could be less.

The secondary recess 65 has a set-back portion, referred to as the secondary set-back portion 651.

The internal face 62 therefore has the central annular portion 63, the set-back portion 641, the bottom 642, the secondary set-back portion 651 and the secondary bottom 652. That radial portion of the plate 53 which has the secondary recess 65 forms the junction between that radial portion of the plate 53 which has the central annular portion 63 and the main recess 64 and the skirt 54 of the end shield 35.

The secondary bottom 652 is set back, in the axial direction, with respect to the bottom 642, the latter being set back, in the axial direction, with respect to the central annular portion 63. The axial thickness of the plate 53 is, in this illustrated example, thinner at the secondary recess 65 than at the main recess 64, the axial thickness of the plate 53 being thinner at the main recess 64 than at the central annular portion 63. Thus, the secondary recess 65 locally decreases the thickness of the plate 53 and locally increases the axial distance separating the bundle from the internal face of the plate, to a distance referred to as the increased axial distance d'.

The minimum axial distance d separating the bundle 20 from the internal face 62 is substantially constant, in this case over a radial thickness less than that of the bundle 20. The increased axial distance d' separating the bundle 20 from the internal face 62 is also substantially constant, in this case over a radial thickness less than that of the bundle 20. Substantially is understood to mean that any variations of these axial distances do not exceed 5%. These variations are due to the undulations or irregularities of the bundle, these in turn being due to the winding 18.

The set-back portion 641 forms the junction between the central annular portion 63 and the bottom 642 of the recess 64, as in the previous example. The description given in the previous example with regard to the set-back portion 641 is applicable to the set-back portion 641 in this exemplary embodiment.

The set-back portion 651 forms the junction between the secondary bottom 652 and the bottom 642. The set-back portion 651 may be arranged axially opposite the bundle 20. The set-back portion 651 may have a curved shape. The curvature of the secondary set-back portion 651 has for example a radius of curvature R' greater than the difference between the increased axial distance d' and the minimum axial distance d.

In this exemplary embodiment, the increased axial distance d' is greater than one and a half times the minimum axial distance d.

In the exemplary embodiments illustrated in FIGS. 3 and 4, the following points apply:
  the ratio of an axial projection t of the fan 48 with respect to the bundle 20 to the height h of the blade 49 is less than 0.2. This ratio may even be negative. Specifically, an axial projection t of the fan 48 with respect to the bundle 20 may be positive, zero or negative;
  the main and/or secondary recesses extend radially between the axial openings 50 and the lateral openings 51;
  the main and/or secondary recesses extend circumferentially around the entire circumference of the internal face 62 of the plate 53, but could extend only around a portion of the circumference of the plate 53 or even between fixing members such as tie rods; or only over the parts of the internal face 62 of the front end shield 35 that have lateral openings 51.

Of course, the invention is not limited to the embodiments described with reference to the figures, and variants could be envisioned without departing from the scope of the invention.

The invention claimed is:

1. A rotary electric machine for a motor vehicle, comprising:
  a stator, extending along an axis, said stator having a body and a winding provided with bundles extending axially on either side of the stator body,
  at least one end shield having a transversely extending plate and a skirt extending axially from the plate,
  the plate having an internal face oriented toward a winding bundle,
  wherein the internal face has a main recess that increases a minimum axial distance separating the winding bundle from the internal face, the main recess having a radially extending bottom,
  wherein the main recess has a set-back portion, and
  wherein the rotary electric machine further comprises a fan having at least one blade, the set-back portion is arranged axially opposite and facing the at least one blade.

2. The rotary electric machine as claimed in claim 1, wherein said at least one blade extends along the axis over a height referred to as a blade height, and wherein the minimum axial distance is between one third of the blade height and half the blade height.

3. The rotary electric machine as claimed in claim 2, wherein the ratio of an axial projection of the fan with respect to the winding bundle to the blade height is less than 0.2.

4. The rotary electric machine as claimed in claim 3, wherein the set-back portion has a curved shape.

5. The rotary electric machine as claimed in claim 3, wherein the internal face has a secondary recess locally bringing the axial distance separating the winding bundle from the internal face to an increased axial distance greater than the minimum axial distance, the secondary recess having a radially extending bottom, referred to as a secondary bottom.

6. The rotary electric machine as claimed in claim 2, wherein the set-back portion has a curved shape.

7. The rotary electric machine as claimed in claim 2, wherein the internal face has a secondary recess locally bringing the axial distance separating the winding bundle from the internal face to an increased axial distance greater than the minimum axial distance, the secondary recess having a radially extending bottom, referred to as a secondary bottom.

8. The rotary electric machine as claimed in claim 1, wherein the set-back portion has a curved shape.

9. The rotary electric machine as claimed in claim 8, wherein a curvature of the set-back portion has a radius greater than or equal to 0.9 times the minimum axial distance.

10. The rotary electric machine as claimed in claim 8, wherein the internal face has a secondary recess locally bringing the axial distance separating the winding bundle from the internal face to an increased axial distance greater than the minimum axial distance, the secondary recess having a radially extending bottom, referred to as a secondary bottom.

11. The rotary electric machine as claimed in claim 1, wherein the internal face has a secondary recess locally bringing the axial distance separating the winding bundle from the internal face to an increased axial distance greater than the minimum axial distance, the secondary recess having a radially extending bottom, referred to as a secondary bottom.

12. The rotary electric machine as claimed in claim 11, wherein the secondary recess has a set-back portion, referred to as a secondary set-back portion, said secondary set-back portion being arranged axially opposite the winding bundle.

13. The rotary electric machine as claimed in claim 12, wherein the secondary set-back portion has a curved shape having a radius of curvature greater than a difference between the increased axial distance and the minimum axial distance.

14. The rotary electric machine as claimed in claim 1, further comprising a rotor mounted on a shaft,
wherein the stator surrounds the rotor, and
wherein the fan is fixed to an axial end face of the rotor.

* * * * *